United States Patent [19]
Taketa

[11] 3,871,611
[45] Mar. 18, 1975

[54] MOLD WITH REMOVABLE AND REPLACEABLE CORE AND CAVITY INSERTS

[75] Inventor: Jun A. Taketa, Glenview, Ill.

[73] Assignee: Phyllis Taketa, Glenview, Ill.

[22] Filed: May 7, 1973

[21] Appl. No.: 357,904

[52] U.S. Cl.................. 249/102, 249/122, 425/444
[51] Int. Cl............................................. B41b 11/62
[58] Field of Search .......... 249/122, 102, 124, 125, 249/126, 176, 177, 155, 170; 164/229, 230, 350, 351, 213, 217, 227, 233; 425/444

[56] References Cited
UNITED STATES PATENTS

| | | | |
|---|---|---|---|
| 1,409,591 | 3/1922 | Schavoir | 249/102 |
| 2,424,235 | 7/1947 | Hoffer | 249/102 X |
| 3,044,121 | 7/1962 | Wiskoff | 249/102 X |
| 3,290,421 | 12/1966 | Miller | 249/176 X |
| 3,398,781 | 8/1968 | Bevis | 164/217 X |
| 3,496,607 | 2/1970 | Larson | 249/102 |
| 3,587,721 | 6/1971 | Feagin | 164/350 |
| 3,723,036 | 3/1973 | Maguire | 425/444 X |

Primary Examiner—Andrew R. Juhasz
Assistant Examiner—John S. Brown
Attorney, Agent, or Firm—Dominik, Knechtel, Godula & Demeur

[57] ABSTRACT

An improved mold having removable and replaceable cores and cavities, so that the need of providing a new mold base for every new part or product is eliminated. By doing so, the mold cost is substantially reduced, since only the cores and cavities need be replaced.

The arrangement of the mold is such that the cores and cavities can be easily and quickly removed and replaced, with minimum down time of the molding apparatus. Furthermore, the replacement can be accomplished without having to remove the mold base from the molding apparatus. Not only does the arrangement provide for reduced mold costs, but it has the further attendant advantage that only the removable cores and cavities need be stored, thus eliminating the need and cost of arranging for the storage of the weighty and bulky mold bases.

3 Claims, 4 Drawing Figures

MOLD WITH REMOVABLE AND REPLACEABLE CORE AND CAVITY INSERTS

This invention relates, in general, to improved molds for injecting molding apparatus and, more particularly, to improved molds having removable and replaceable cores and cavities. More particularly still, the invention relates to an arrangement for the easy assembling of removable and replaceable cores and cavities in a mold.

Injection molding techniques have for some time been used for molding various parts, particularly of plastics. The injection molding apparatus conventionally consists of a mold formed of two halves, one of which defines a cavity and the other a core, to provide a mold cavity corresponding to the part to be molded. The material of which the part is to be molded is injected into the mold cavity, and when the part is molded, the mold halves are opened to eject the finished part. The molding apparatus, of course, is adapted to open and close the mold halves, and to hold the mold halves tightly together in precise alignment. One of the two mold halves usually is stationary while the other is movable.

Normally, for each part to be molded, a complete mold consisting of two mold halves, one defining the core and the other the cavity, is provided. In many cases, the cost of such a mold is substantial and, unless a large number of parts are to be molded, the cost is excessive. Also, in many other cases, unless a multiple cavity mold (eight cavities or more) is used in molding the parts, the cost of the molded parts likewise is excessive. In other words, in the case of low volume parts, the piece cost for molding the parts is substantially higher than in the case of high volume parts.

For these and other reasons, it is proposed by the present invention to provide an improved mold having removable and replaceable cores and cavities, so that the need of providing a new mold base for every new part or product is eliminated. By doing so, the mold cost is substantially reduced, since only the cores and cavities need be replaced.

The arrangement of the mold is such that the cores and cavities can be easily and quickly removed and replaced, with minimum down time of the molding apparatus. Furthermore, the replacement can be accomplished without having to remove the mold base from the molding apparatus. Not only does the arrangement provide for reduced mold costs, but it has the further attendant advantage that only the removable cores and cavities need be stored, thus eliminating the need and cost of arranging for the storage of the weighty and bulky mold bases.

A still further advantage of the arrangement is that several different parts can be molded in the same mold, so long as the parts are to be molded of the same material. In other words, the cores and cavities of several different parts, for example, low volume parts, can be assembled within the same mold base and molded in a larger molding apparatus. As a result, the piece cost of the parts are equivalent to the cost of molding parts in a multiple cavity mold.

Accordingly, it is an object of the present invention to provide an improved mold for injection molding apparatus.

More particularly, it is an object to provide an improved mold having removable and replaceable cores and cavities.

More particularly still, it is an object of the present invention to provide an arrangement for removing and replacing cores and cavities in a mold base.

In this respect, it is a further object to provide an improved mold having removable and replaceable cores and cavities arranged such that the cores and cavities can be removed and replaced with minimum down time of the molding apparatus.

Further still, it is an object to provide an improved mold base having removable and replaceable cores arranged such that the cores and cavities can be removed and replaced without having to remove the mold base from the molding apparatus.

A still further object is to provide an arrangement whereby cores and cavities for several different parts can be assembled with any mold base and the different parts molded at a cost quivalent to the cost of similar parts molded in a multi-cavity mold, thereby substantially reducing the cost of low volume parts.

Other objects of the invention will in part be obvious and will in part appear hereinafter.

For a fuller understanding of the nature and objects of the invention, reference should be had to the following detailed description taken in connection with the accompanying drawings, in which.

Similar reference characters refer to similar parts throughout the several views of the drawings.

Figure 1:
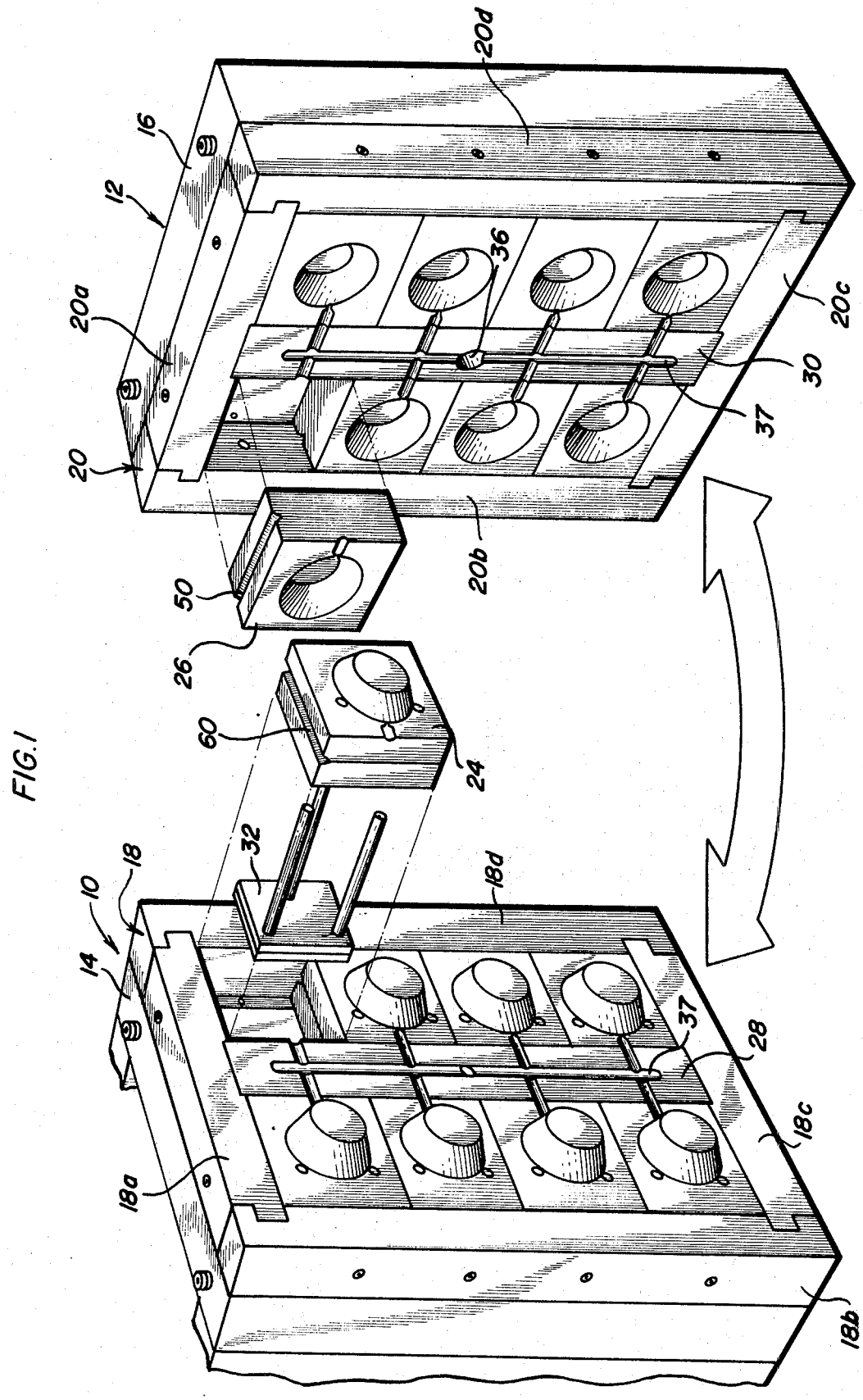
FIG. 1 is a perspective view, partially exploded, generally illustrating a pair of mold halves having removable and replaceable cores and cavities, exemplary of the present invention.
Figure 2:
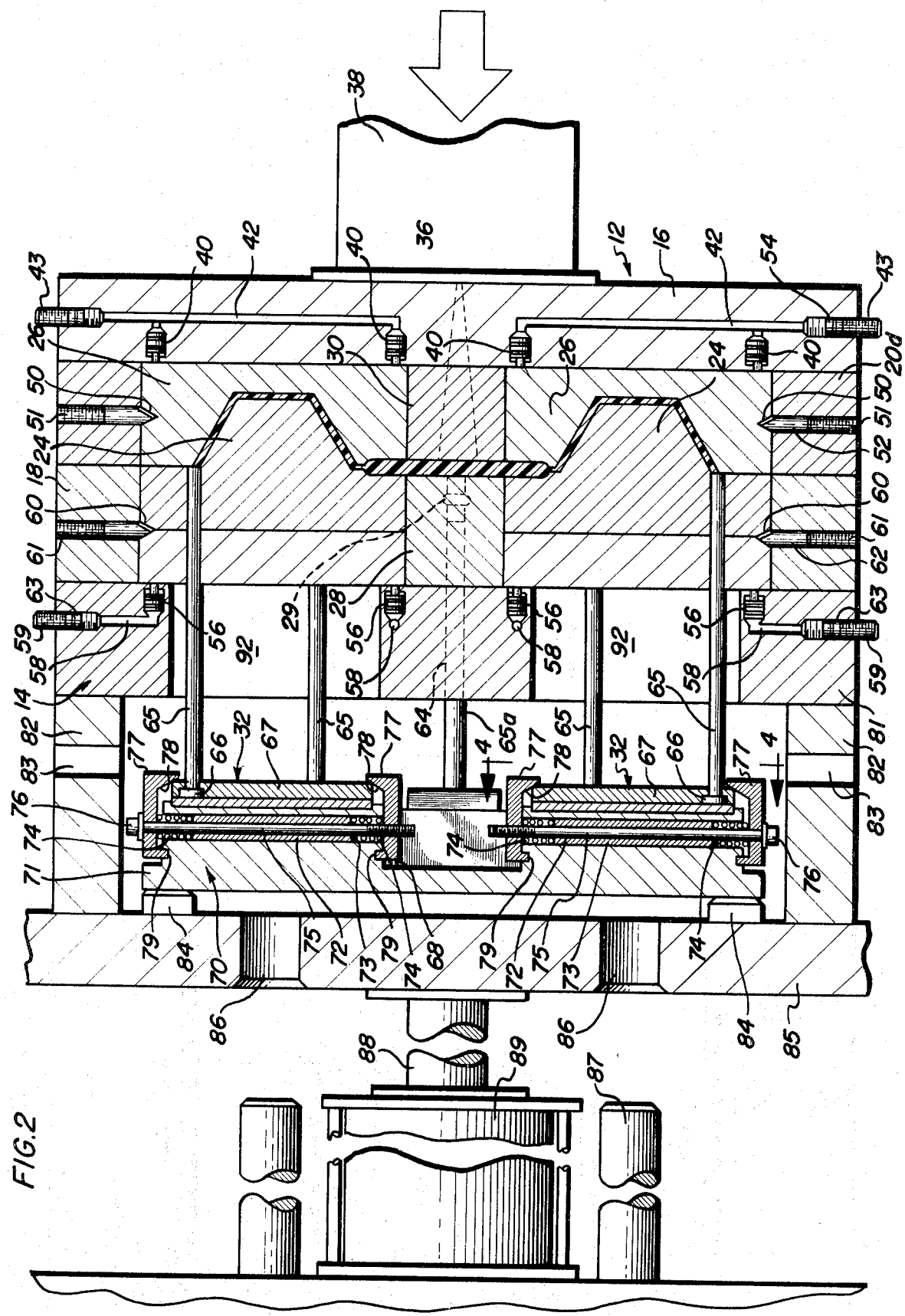
FIG. 2 is a sectional view taken generally transversely through the closed mold halves, to illustrate the manner in which the removable cores and cavities are assembled therein, together with the ejector pin assemblies.
Figure 3:
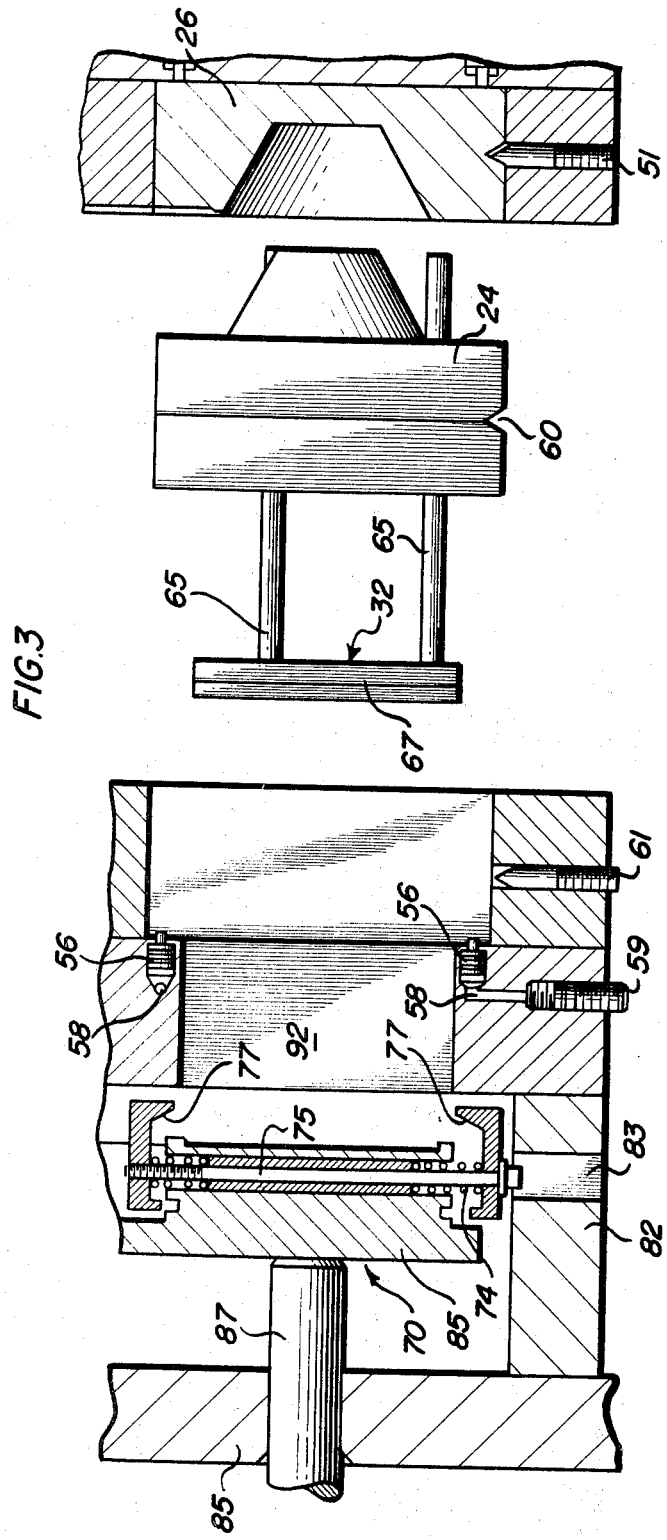
FIG. 3 is a partial sectional view, generally illustrating the manner in which one of the removable cores and its associated ejector pin assembly is removed from the mold base.

Referring now to the drawings, in FIG. 1 there is illustrated the mold halves 10 and 12 including, in the illustrated embodiment, removable cores 24 and cavities 26, respectively. These mold halves 10 and 12 are held in operational engagement one with the other so as to define a mold cavity by apparatus, not shown, associated with any known type of injection molding apparatus, a part of which is generally illustrated in FIG. 2. The mold half 10 is formed of a mold base 14 which may be of generally standard construction to which is fixedly secured a frame or pocket 18 fabricated of bars 18a-18d of harden stainless steel or other similar material interlocked together to provide a pocket therein of precise dimensional tolerances. In the illustrated embodiment, the mold half 10 is designed to receive therein eight mold cores 24 and a runner bar 28, in the manner more fully described below.

The mold half 12 is of a substantially corresponding construction and has a mold base 16 to which is secured a frame or pocket 20 which also is fabricated of bars 20a–20d of hardened stainless steel or the like which are interlocked together to form therein a pocket of precise dimensional tolerances. The pocket 20 of the mold half 12, in this case, is adapted to receive the mold cavities 26 and a runner bar 30, in the manner described more specifically below.

As indicated above, the cores 24 and the cavities 26 are adapted to be removably secured within the mold halves 10 and 12, so that they may be easily and quickly removed and replaced. Furthermore, the arrangement is such that they may be removed and replaced without the necessity of removing the mold base from the molding apparatus. An ejector pin assembly 32 is associated with each of the mold cores 24, and these ejector pin assemblies likewise are adapted to be removed and replaced along with the mold cores 24.

The manner in which the mold cavities 26 and the mold cores 24, together with their ejector pin assemblies 32 are removably secured within the mold halves 10 and 12 can be best seen in FIG. 2. The pockets 18 and 20 are of precise dimensional tolerances, and the cavities 26, the cores 24 and the runner bars 28 and 30 likewise are machined with precise dimensional tolerances, so as to tightly nest within the respective pockets 18 and 20. The runner bars 28 and 30 are fixedly secured within slots provided in the bars 18a, 18c and 20a, 20c, and within the pockets 18 and 20. The runner bar 30, in the illustrated embodiment, and the rear wall of the mold base 16 are provided with a sprue 36 through which the material, such as plastics, of which the part or parts are to be molded, can be injected from a plastic extrusion or injection apparatus 38, into the injection channels 37 formed in the runner bars and the cavities and cores to the mold cavities defined by the cores 24 and cavities 26. The runner bar 28 is provided with a cavity 29 for receiving a cold slug. The manner in which material is injected is again generally well known in the art.

While the cores 24 are tightly nested within the pocket 18 of the mold half 10, they are further secured therein by means of set screws 61 which are threadedly received within cavities provided in the bars 18a–18d which form the pocket 18. Each of the cores 24 has a groove 60 formed in at least one and preferably two of the sides thereof, as can be best seen in FIGS. 1 and 2. The set screws 61 each have tips 62 thereon which have the ends thereof correspondingly formed to be received within the grooves 60 in the cores 24, as can be best seen in FIG. 2. These tips 62 can have either a cone or chisel point on them, and can be freely disposed within the cavities to engage within the grooves or alternatively, they can be rotatably secured to the set screws 61. In either case, when the set screws 61 are threaded into the bars 18a–18d, the tips 62 are forcibly urged into engagement within the grooves 60, to secure the cores 24 within the pocket 18.

Correspondingly, each of the cavities 26 likewise have grooves 50 formed in at least one and preferably two of the side edges thereof, and the bars 20a–20d forming the pocket 20 of the mold half 12 is provided with threaded cavities for receiving set screws 51 and the tips 52. As in the case of the cores 24, when the set screws 51 are threaded into the bars 20a–20d, the tips 52 are forcibly urged into engagement within the grooves 50, to secure the cavities 26 within the pocket 20.

An ejector pin assembly 32, as indicated above, is associated with each of the cores 24, and as can be best seen in FIG. 2, these ejector pin assemblies 32 all are fixedly and removably secured to an ejector assembly 70 retained within an open pocket provided in the mold base 14 of the mold half 10, which pocket is defined by the front wall 81, the side walls 82 and the back plate 85. The ejector assembly 70 is formed of an ejector support plate 71, which is generally a flat plate having grooves 68 formed in it, for reasons set forth more fully below. Bores 72 are formed in the ejector support plate 71 for receiving tubular bushings 73 and threaded screws 75 which are used to removably secure the ejector pin assemblies 32 to it, as described more fully below. At each of the opposite ends of the bushings 73, within the bores 72, there are provided helical biasing springs 74 which are disposed about the threaded screws 75. These biasing springs 74 bear against a pair of clamp members 77 carried by the threaded screw 75 and generally disposed within the grooves 68. One of the two clamp members 77 is slidably disposed on the threaded screw 75, while the other one thereof is threaded to receive a threaded portion of the threaded screw 75. The clamp members 77 are generally U-shaped in cross-section and the one leg thereof is provided with a tapered cam surface on the lower edge thereof while its other leg is formed to be slidably received within a slot 79 formed in the ejector support plate 71. the threaded screws 75 are provided with a hex head 76 or the like for receiving a tool to threadedly adjust them. With this construction, the clamp members 77 normally are biased in spaced apart relationship and when the threaded screw 75 is threaded through the one clamp member 77, the two clamp members are drawn together against the biasing action provided by the springs 74. The clamp members 77 are retained in positional alignment by the lower leg sliding in the slots 79.

Figure 4:
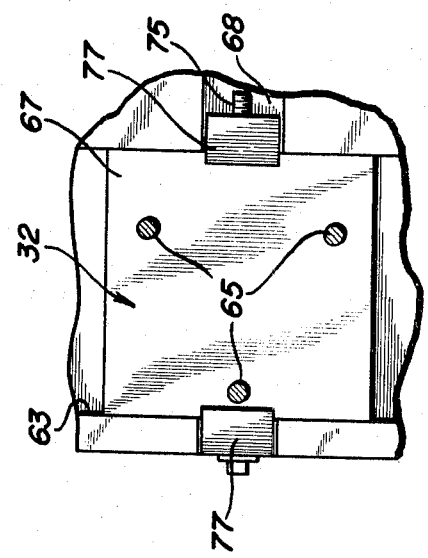
FIG. 4 is a sectional view taken along lines 4—4 of FIG. 2, illustrating the manner in which one of the ejector pin assemblies is secured within the mold base.

The ejector plate assemblies 32, as can be best seen in FIGS. 2 and 4, include a number of ejector pins 65 (three in the illustrated example) which are secured to an ejector pin plate 67, in any suitable fashion. For example, each of the ejector pins 65 may have an enlarged head 66 on the end thereof which are secured between a pair of plates which are formed to receive them and which form the ejector plate 67. The ejector pins 65 are slidably received within the pin receiving bores within the cores 24. The ejector support plate 70 has two shallow, parallel grooves 63 (FIG. 4) formed in it, in which the ejector plates 67 seat to locate.

As indicated above, while the mold halves 10 and 12 are held in operational engagement one with the other so as to define a mold cavity by apparatus, not shown, associated with any known type of ejection molding apparatus, for the purpose of briefly explaining the operation of the latter, the molding apparatus is generally illustrated in FIG. 2 to include hydraulic apparatus 89 having a piston 88 which is extended and retracted to open and close the mold halves 10 and 12. In FIG. 2, when the mold halves 10 and 12 are closed, plastic material, for example, is forced under pressure by the ejection apparatus 38 through the sprue 36 into the injection channels 37 and hence through the mold cavities formed by the cores 24 and cavities 26, to mold the parts. When the parts have been formed, the molding apparatus is operated to retract the piston 88 and the latter is fixedly secured to the back plate 85 of the mold base 14 of the mold half 10, to open the mold halves 10 and 12. As the mold half 10 opens, a pair of activating pins 67 forming a part of the molding apparatus slidably extend through the bores 86 formed in the back plate 85 and engage the ejector assembly 70. As a result, the ejector assembly 70 is caused to move to slidably extend the ejector pins 65 through the cores 24 to eject or remove the molded parts. An ejector pin 65a may be fixedly secured to the ejector support plate 71 to extend through a bore 64 formed in the front wall 81 of the mold base 14 and the runner bar 28 to remove the material in the injection channels 37. When the parts have been removed and the mold halves 10 and 12 again close, the ejector assembly 70 and the ejector pin assemblies 32 affixed to it are returned to the position shown in FIG. 2, by the action of the mold cavities 26 engaging the ends of the ejector pins 65.

To remove the cores 24, their associated ejector pin assemblies 32, and the cavities 26, the mold halves 10 and 12 are opened, in the manner described above. The set screws 51 and 61 then are unthreaded to disengage the tips 52 and 62 from the grooves 50 and 60 within the respective cavities 26 and cores 24. As previously indicated, the cores 24 and the cavities 26 are tightly nested within the pockets 18 and 20, and are generally difficult to remove without some assistance. For this purpose, the mold base 16 of the mold half 12 is provided with a number of cavities in which piston cylinders 40 are retained. There are two of these piston cylinders 40 associated with each of the mold cavities 26, and a hydraulic channel or bore 42 in in open communication with the cavity in which each of these two piston cylinders 40 are retained. These hydraulic channels or bores 42, in the illustrated example, extend outwardly towards the side walls of the mold base 16 to threaded cavities in which pistons and set screws 43 are disposed. The hydraulic channels or bores 42 are filled with any suitable medium, such as oil, which is compressed and caused to exert a pressure on the pistons 40 when the set screws 43 are threaded into the cavities in which they are retained against the pistons 54. The pistons 40 each have pins formed on the front faces thereof which extend through an aperture in a stop on the end of the cavity and engage against the rear face of the cavities 24. Accordingly, these pistons 40 forcibly urge the respective ones of the cavities 24 outwardly from their nested positions sufficiently to permit them to be removed from the pocket 20 with a suitable tool.

Correspondingly, a pair of pistons 56 are associated with each of the cores 24 and are disposed within cavities formed in the front wall 81 of the mold base 14. Hydraulic channels or bores 56 are in open communication with the cavities in which the pistons 56 are retained and contain a medium, such as oil, which is compressed by pistons 63, upon threading the threaded screws 59 to exert a force on the pistons 56. As in the case of the pistons 40, the pistons 56 have pins formed on the front faces thereof which extend through apertures and stop means on the ends of the cavities to engage the rear faces of the cores 24 to forcibly urge them out of the pocket 18, when the set screws 59 are threaded into the cavities in which they are disposed. Again, with this action, the cores 24 are sufficiently extended out of the pocket 18 to permit them to be removed with a suitable tool.

When the mold halves 10 and 12 are open, the ejector assembly 70 and the ejector pin assemblies 32 affixed to it are positioned such that the threaded screws 75 can be oeprated by means extended through apertures or bores 83 formed in the side walls 82 of the mold base 14. When the threaded screws 75 are unthreaded, the biasing springs 74 forcibly urge the clamp members 77 outwardly in spaced apart position to releasably disengage the ejector pin plates 67 and hence the ejector pin assemblies 32 from the ejector support plate 71. When the clamp members 77 have been disengaged, the ejector pin assemblies 32 can be removed through the front wall 81 of the mold base 14, through the openings 92 provided in the front wall 81.

As indicated above, different cores 24 and cavities 26 can be replaced within the mold halves 10 and 12 to form different parts. In doing so, the ejector pin assemblies associated with the new or different cores 24 are extended through the openings 92 in the front wall 81 of the mold base 14, and the ejector pin plates 67 thereof secured atop the ejector support plate 71, by threading the threaded screw 75 to engage the clamp members 77 with the ejector pin plate 67, as illustrated in FIG. 2. The cores 24 then are fitted into the pocket 18 and secured therein by means of the threaded screws 61 and the tips 62, when the latter are lockingly engaged within the grooves 60 provided in the side edges of the cores 24. The cavities 26 correspondingly are fitted within the pocket 20 of the mold half 12, and secured therein by means of the set screws 51 and the tips 52, with the tips 52 being lockingly engaged within the grooves 50 formed in the side edges of the cavities 26.

It may be noted that all of the set screws for locking the cores and the cavities in position within the pockets of the mold halves and the set screws for operating the pistons for removing the cores and the cavities from the pockets all are disposed on the side edges of the mold halves so that they are easily accessible. With the described construction and arrangement, it is found that the cores, the cavities and the associated ejector pin assemblies all can be removed from the mold halves and replaced, without the necessity of removing the mold base from the molding apparatus. Accordingly, with this arrangement, the cores, cavities and ejector pin assemblies can be easily and quickly removed and replaced, with minimum down time of the molding apparatus.

With a mold of the above described construction, it is apparent that several different parts can be molded in the same mold so long as the parts are to be molded of the same material. The cores and cavities for the different parts are assembled within the same mold base so that effectively a multi-cavity mold is provided so that low volume parts can be molded in the same fashion as high volume parts would be molded in a multi-cavity mold. As a result, the piece cost of the parts can be molded for a cost equivalent to high volume parts.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

What is claimed is:

1. A mold assembly particularly adapted for use in the molding of materials comprising, in combination: a movable mold half and a fixed mold half, each of which includes a mold base having a pocket defined in the front face thereof in which a plurality of blocks are disposed, said blocks within said movable mold half each defining a core and said blocks within said fixed mold half each defining an associated cavity, whereby said blocks provide a plurality of mold cavities when said mold halves are closed, said blocks being precisely dimensioned to nest within said pockets, each of said blocks having at least one groove therein, a plurality of locking means threadedly disposed within the walls defining said pocket in the respective mold halves and positioned to lockingly engage within said groove of an associated one of said blocks to removably and fixedly secure said block within said pocket, said mold bases each have a plurality of piston means movably secured therein, at least one of said piston means being positioned to engage each of the respective ones of said blocks to forcibly urge them out of said pockets, a hydraulic bore in communication with the respective ones of said piston means and containing a medium which when compressed exerts a pressure on said piston means to engage it with said block to forcibly urge it out of said pocket, and a threaded screw associated with each of said hydraulic bores when threadedly manipulated functions to compress the medium within said hydraulic bore to exert a pressure on said piston means.

2. The mold assembly of claim 1, wherein said threaded screws and said locking means all are located on said mold halves to permit them to be operated to remove said blocks without the necessity of removing said mold halves from a molding apparatus.

3. A mold assembly particularly adapted for use in the molding of materials comprising, in combination: a movable mold half and a fixed mold half, each of which includes a mold base having a pocket defined in the front face thereof in which a plurality of blocks are disposed, said blocks within said movable mold half each defining a core and said blocks within said fixed mold half each defining an associated cavity, whereby said blocks provide a plurality of mold cavities when said mold halves are closed, said blocks being precisely dimensioned to nest within said pockets and normally being removably secured therein, means operable when it is desired to remove said blocks from said pocket to engage respective ones of said blocks to forcibly urge them out of said pocket, an ejector pin assembly associated with each of said blocks defining a core, each of said ejector pin assemblies comprises a plurality of ejector pins secured to an ejector pin plate, an ejector assembly reciprocably operated as said movable mold half is moved to open and close said mold halves, said ejector assembly comprising a clamp assembly associated with each of said ejector pin assemblies for removably securing them to said ejector assembly, whereby said ejector pin assemblies are operated with said ejector assembly to eject a mold part from said blocks defining a core as said movable mold half is moved to open said mold halves, each of said clamp assemblies comprising a pair of clamp arms movably supported on said ejector assembly and positioned to clampingly engage said ejector pin assemblies to said ejector assembly, means for normally biasing said clamp arms in spaced apart positions disengaged from said ejector pin plates, and means for moving said clamp arms against said biasing means to clampingly engage them with an ejector pin plate to secure said ejector pin assembly to said ejector assembly, said ejector pin assemblies being removable together with said blocks defining a core, whereby said blocks defining a core and a cavity both can be removed from said mold halves together with said ejector pin assemblies and replaced with other blocks and ejector pin assemblies for molding a different part.

* * * * *